H. Wendt,
Sheep Shears,

No. 80,255          Patented July 21, 1868.

Witnesses:
Wm. A. Mogan.
G. C. Cotton.

Inventor:
H. Wendt
per Munn & Co.
Attorneys.

United States Patent Office.

HERMANN WENDT, OF ELIZABETH, NEW JERSEY, ASSIGNOR TO HENRY SEYMOUR AND COMPANY, OF NEW YORK CITY.

*Letters Patent No. 80,255, dated July 21, 1868.*

IMPROVEMENT IN SHEEP-SHEARS.

*The Schedule referred to in these Letters Patent and making part of the same.*

TO ALL WHOM IT MAY CONCERN:

Be it known that I, HERMANN WENDT, of Elizabeth, in the county of Union, and State of New Jersey, have invented a new and useful Improvement in Sheep-Shears; and I do hereby declare that the following is a full, clear, and exact description thereof, which will enable those skilled in the art to make and use the same, reference being had to the accompanying drawings forming part of this specification.

This invention relates to a new and useful improvement in the construction of sheep-shears, and is an improvement on a process of construction which was patented by Hermann Wendt and Henry Seymour, the Letters Patent bearing date November 22, 1864.

The object of the present invention is to obviate the wearing of what are commonly termed the "stops," which are employed to prevent the blades of the shears from passing each other.

Hitherto these stops have been formed entirely of iron, but by my improvement I form them of steel and iron combined, and in such a manner that the process of construction, as described in the Letters Patent of Wendt and Seymour, above alluded to, is not interfered with in the least.

In the accompanying sheet of drawings—

Figure 1:
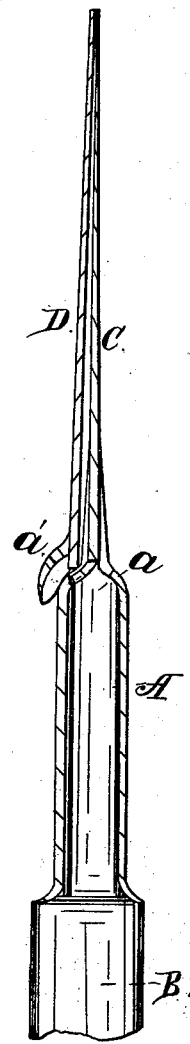

Figure 1 is an edge view of of one-half of a pair of shears, partly finished, according to my improvement.

Figure 2:
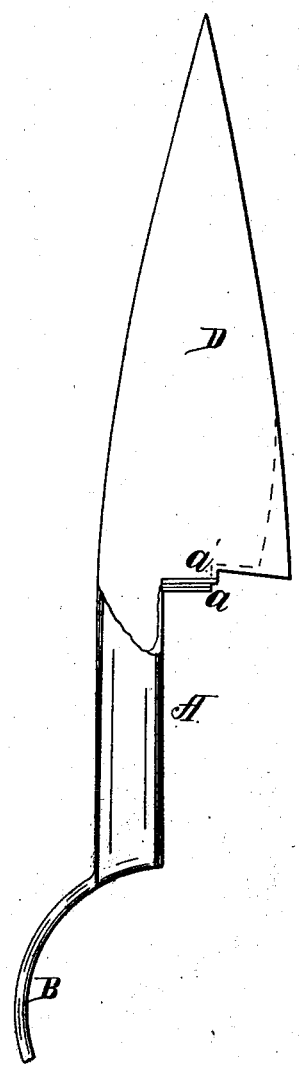

Figure 2, a side view of the same.

Similar letters of reference indicate corresponding parts.

A represents one of the shanks, and B a portion of the spring-bow of the shears.

C is the iron back plate, and D the steel front plate of the blade, said plates being welded together and to the shank A, in the same way as described in the Letters Patent of Wendt and Seymour.

The iron plate C is formed with a projection or ear, $a$, at its base or inner end, in the same way as before; and a similar ear or projection, $a'$, is at the base or inner end of the steel plate C, (see fig. 1,) in which the plates C D are not welded together.

This steel ear or projection $a'$ constitutes the improvement, the iron and steel ears $a$ $a'$ being welded together at the same time the plates C D are welded.

The blades are tempered in the usual way, to wit, by first rendering them as hard as possible, and then drawing the temper at their cutting-edges, the ears or projections $a'$ being left in their original hard state.

These projections or ears, thus constructed or formed, constitute what are termed "stops," to prevent the blades from crossing each other, and are rendered extremely durable, as the hardened steel portions $a'$ effectually resist wear, and will last as long as the other portions of the shears, whereas the ordinary stops, or those constructed in the common way, exclusively of iron, soon become worn in consequence of being brought rapidly in contact in using the shears, a contingency which my improvement effectually obviates.

Having thus described my invention, what I claim as new, and desire to secure by Letters Patent, is—

The combination of the projection or ears $a$ $a'$, formed respectively at the inner ends of the iron and steel plates C D of the blades, and welded together to constitute the stops of sheep-shears, substantially as herein set forth.

The above specification of my invention signed by me, this    day of    , 1868.

HERMANN WENDT.

Witnesses:
STANLEY G. MASON,
JAMES M. HADDEN.